United States Patent [19]

Stauffer

[11] Patent Number: 4,767,934
[45] Date of Patent: Aug. 30, 1988

[54] ACTIVE RANGING SYSTEM

[75] Inventor: Norman L. Stauffer, Arapahoe, Colo.

[73] Assignee: Honeywell Inc., Minneapolis, Minn.

[21] Appl. No.: 881,428

[22] Filed: Jul. 2, 1986

[51] Int. Cl.⁴ .................................................. G01C 3/08
[52] U.S. Cl. .................................... 250/561; 250/201;
356/4; 356/375
[58] Field of Search ............... 250/201, 204, 561, 203;
354/403; 356/4, 375

[56] References Cited

U.S. PATENT DOCUMENTS

| 3,671,127 | 6/1972 | Odone et al. | 250/204 |
| 3,759,615 | 9/1973 | Loewe | 356/375 |
| 4,150,285 | 4/1979 | Brienza et al. | 250/203 |

Primary Examiner—Edward P. Westin
Attorney, Agent, or Firm—Charles J. Ungemach

[57] ABSTRACT

A surface position sensor in which energy is directed along an axis to the surface, is reflected back along the axis, and is focused on an elongated detector at a position along its length indicative of the distance to the surface.

15 Claims, 1 Drawing Sheet

ACTIVE RANGING SYSTEM

BACKGROUND OF THE INVENTION

It is often desirable to be able to determine the distance to a surface or to an object without there being physical contact with the object. For example, in my co-pending application Ser. No. 675,665, Filed Nov. 28, 1984, I describe a surface position sensor in which a beam of energy is directed toward a surface at a predetermined angle so that light is focused at a point on the surface when the surface is in the middle or center position of its extremes. Reflected light is received by an optical system located at a similar angle from the projection system but on opposite sides thereof and energy that is reflected parallel to the optic axis passes through an aperture so as to reach a detector at a position which is indicative of the position of the surface. The detector used in this application was referred to as a "lateral effect photo-diode" detector which is temperature sensitive and in some cases rather unpredictable.

In my co-pending application Ser. No. 826,057, Filed Feb. 4, 1986, and now abandoned, I describe a radiation position sensor comprising an elongated piece of material which could receive radiation from the reflected surface and diffuse or scatter such radiation within itself. The material was surrounded by a layer of material having a reflective interior surface and as the beam of radiation entered the tube through a window it would diffuse out towards either end in an amount which varied with the distance from the entrace point to the ends. Normal photo-diodes were mounted at each end and it was found that the effects of temperature were less pronounced and more repeatable possibly because the material scattered the light to the normal photo-diodes rather than causing electron migration as was the case with the latteral effect photo-diodes.

SUMMARY OF THE INVENTION

The present invention provides an active ranging system which does not require the probe to be placed at an angle with respect to the surface that it is measuring as is the case with my above-mentioned co-pending application Ser. No. 675,665 and which is adapted to utilize the improved sensitive detectors of my above-mentioned co-pending application Ser. No. 826,057. More particularly, the present invention utilizes a radiation transmitter such as a light emitting diode projecting energy such as infrared energy along an axis to a surface whose position is to be measured. The surface, being illuminated with a spot of light, will reflect the energy back along the axis where it is received and directed to energy responsive detectors mounted nearby or around the axis or to an elongated sensor mounted along the axis. The return energy will form a spot or band of light on the detectors which is at a first position when the surface is at its far extreme position, at a second position when the surface is at its near extreme position, and at a third intermediate position when the surface is at positions between the far and near extremes. By determining the position of the return spot or band of light, an indication of the range to the remote surface is obtained.

DETAILED DESCRIPTION OF THE PREFERRED EMBODIMENTS

Figure 1:
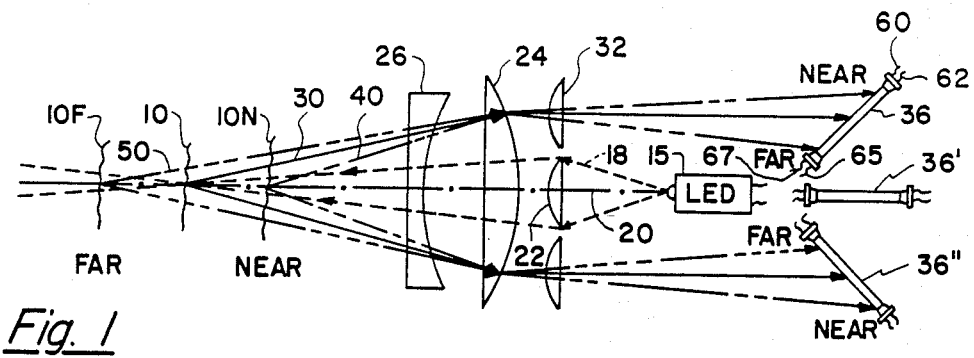
FIG. 1 shows a first embodiment of the ranging system of the present invention.

In FIG. 1, a surface 10 whose position is to be measured between a far extremity 10F and a near extremity 10N is shown as an irregular line to indicate that the surface may be diffuse in nature. A radiation generating device such as a light emitting diode 15 is shown directing energy along lines such as dash lines 18 generally in the direction of an axis shown by dash-dot line 20. The transmitted energy may be visible energy but is preferably IR energy because the efficiency of the detectors is better using IR. The IR may be modulated so that signals from other IR sources such as the sun or light bulbs may be filtered out. The energy passes through a first lens 22 and a second lens 24 so as to focus the energy as a spot of light on the remote surface 10. A concave lens 26 is also shown and may be used to correct for aberration.

The spot of light which is projected onto the surface 10 is reflected along paths which depend upon the position of the surface between the far and near extremes. When the surface is shown in the central or intermediate position 10, then the reflected light will pass along lines such as solid line 30 back through the aberration correcting lens 26, lens 24, and a lens 32 where it will be focused as a small spot of light on a tilting detector surface identified by reference numeral 36. Detector 36 may be a lateral effect photo-diode as was used in the above-mentioned co-pending applciation Ser. No. 675,665 or, preferably may be the improved sensor of the above-mentioned co-pending application Ser. No. 826,057. Sensor 36 may be mounted on a conical shaped member not shown for convenience, and it should be noted that although one sensor could be used, in the preferred embodiment four such detectors, evenly spaced around the surface of the cone, are used. In FIG. 1, three of these detectors are shown by reference numerals 36, 36' and 36", with the fourth detector being located upwards from the surface of the drawing and not shown. It should also be noted that light from the surface 10 travelling along paths such as 30 also strikes detectors 36', 36", and the unshown detector at a central location along the length thereof.

If the surface 10 were in the position shown as 10N, then light would be reflected along a path 40 shown by two short dashes and one long dash. Path 40 leads through lenses 26, 24, and 32 so as to form a spot of light on sensor 36 near its upper or "near" end. Similarly, light from surface 10N would strike the right hand portion of detector 36' and the lower portion of detector 36" as well as the detector not shown.

If the surface were at the position shown as 10F, then light would be reflected along paths such as shown by reference numeral 50 shown in FIG. 1 as a line having four short dashes and one long dash. This light would pass through lenses 26, 24, and 32 so as to strike the detector 36 along the lower portion thereof in the "far" region. Similarly light travelling from surface 10F would strike detector 36' near its left end and near the upper end of detector 36" as well as the unshown detector.

It is thus seen that energy reflected from surface 10 will strike the detectors 36, 36', 36", and the unshown detector at positions which depend upon the distance from the apparatus to the remote surface. Four detectors are preferable since the oppositely positioned detectors provide for compensation when the surface 10 is not uniform in reflectivity since non-uniform energy effects opposite detectors in a compensating manner as will be described in connection with FIG. 2 below. A surface which has complex reflective properties can thus also be compensated due to the collection of radiation at several locations relative to the central axis. The tipping of the photo-diodes helps to keep the reflected images in focus and to help make the response more linear. It also helps to increase the amount of spot position change with surface position change.

The outputs of the photo-detectors such as 36 are shown by a pair of conductors indicated in FIG. 1 with reference numerals 60 and 62 for the near end of detector 36 and by reference numerals 65 and 67 for the far end of detector 36. Similar outputs are shown on detectors 36' and 36" and would appear on the unshown detector.

Several ways of combining the outputs from the detectors are possible. For example, the distance computed for the spot position of each of the sensors may be added, or the outputs of all the sensors may be combined in parallel. It is also possible for the sensors to be operated in connection with a log response or ratio and non-linear weighting of the outputs is possible. While the logarithm of the outputs of the detectors may be taken and used to make the signal changes more linear with surface position, I prefer to use non-log signals because the output is more representative of the center of the spot or band of energy and thus more accurate. Also, the temperature effects are less when the output is non-log. If desired, only certain ones of the sensors may be used as, for example, where the outputs of the sensors differed then, the largest value and the smallest value could be rejected. A preferred circuit for utilizing the combined outputs and producing a resultant signal indicative of the spot position and thus the distance to the remote surface 10 will be described in connection with FIG. 4 below.

Figure 2:
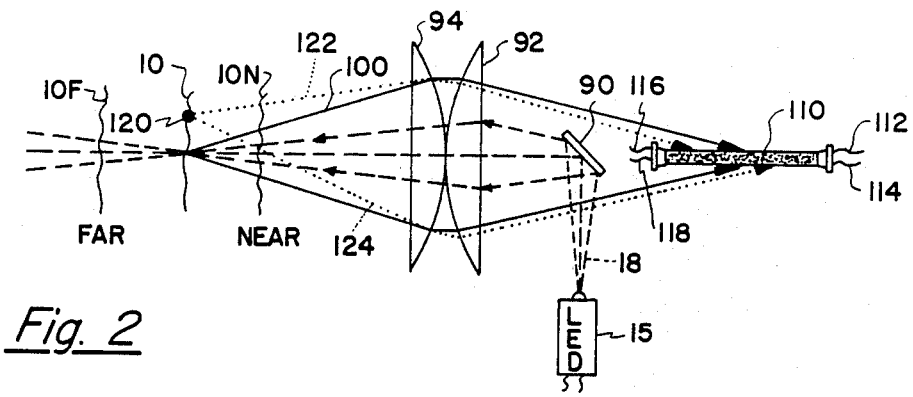
FIG. 2 shows a second embodiment of the ranging system of the present invention.
Figure 4:
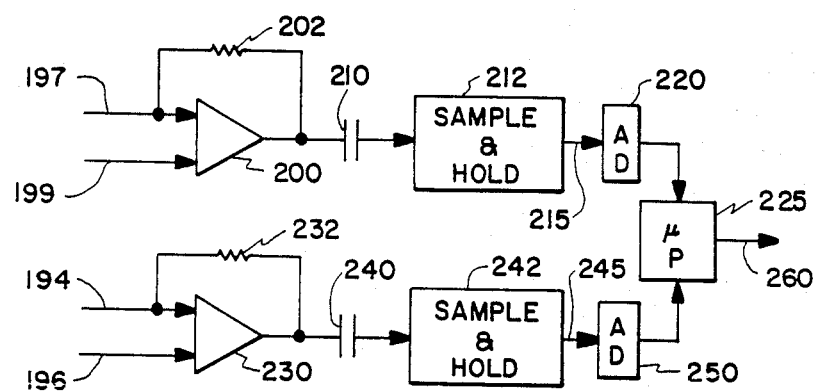
FIG. 4 shows a schematic diagram for an electronic circuit useful in obtaining an output indicative of the range to the remote surface.

In FIG. 2 a system similar to that of FIG. 1 is shown but where the reflected return signals are directed to a single horizontally located spot position sensor. In FIG. 2 the surfaces 10, 10N, and 10F are again shown as they were in FIG. 1. The LED 15 is shown in FIG. 2 directing energy along paths such as dash line 18 from an off axis position to an on axis reflector or mirror 90 from whence the energy is directed through lenses 92 and 94 to the surface 10 in a manner similar to that shown in FIG. 1. In FIG. 2 no aberration correction lens is shown and the reflections which occur from the positions of the surface 10F and 10N are not shown for simplicity. Energy reflected from surface 10 will pass along lines such as solid line 100 back through the lenses 94 and 92 to a horizontally positioned spot position detector 110 which may be of the sort described in my above-mentioned co-pending application Ser. No. 826,057. It will be seen in FIG. 2 that the returning light strikes detector 110 at about the central position when surface 10 is in the position shown. If surface 10 were in the position shown as 10N, then the reflected energy would be directed so as to strike the detector 110 towards the right end thereof while if the surface were in the position shown as 10F, the return energy would strike the sensor 110 towards its left end. As was the case in connection with FIG. 1, the position of the returning energy on the detector 110 will provide an indication of the distance to the remote surface 10. Outputs from detector 110 such as shown on the right end by lead lines 112 and 114 and on the left end by lead lines 116 and 118 can be used to produce signals for use in connection with a circuit such like that as shown in FIG. 4.

In FIG. 2 an off axis hot spot 120 is shown on surface 10 in order to describe how non-uniform reflecting surfaces may be compensated by the present invention. The hot spot 120 will direct its radiation along paths shown as dotted lines 122 and 124 back through lenses 94 and 92 onto the detector 110. However, it should be noted that the energy directed along line 122 strikes the detector 110 more towards its left end while the energy directed along line 124 strikes the detector more towards its right end. This, of course, will occur around the entire periphery of the elongated detector 110 but in any event the result is to cancel out much of the effects of the hot spot 120 since the output on lines 112 and 14 will be more affected by the lower energy path 124 while the output on lines 116 and 118 will be more affected by the energy from the upper path 122 and these two signals in the circuit of FIG. 4 will tend to cancel one another.

If the output modulated current signal from the left end of the detector 110 is identified as A and the output modulated current signal from the right end of the detector 110 is identified as B then, the distance to the remote surface D will be a function of $(A-B)/(A+B)$ and this can be computed using a microprocessor A preferred circuit for determining the spot position and thus the distance to the remote object will be described in connection with FIG. 4 below.

Figure 3:
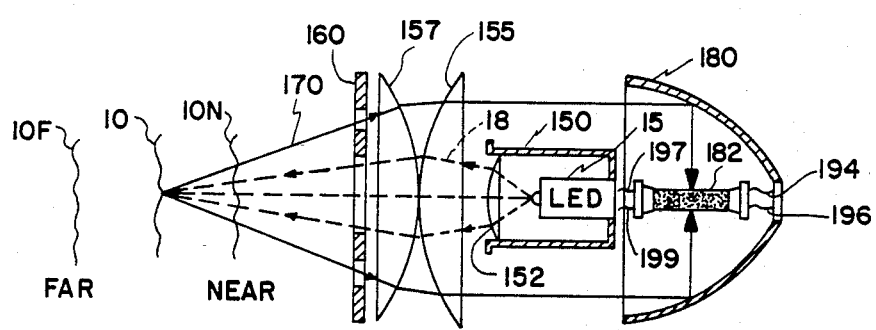
FIG. 3 shows a third embodiment of the ranging system of the present invention.

FIG. 3 shows a third embodiment of the system of the present invention in which a parabolic reflector is used to direct the return radiation to the elongated detector. In FIG. 3 the surface 10 and its far and near positions 10F and 10N respectively are the same as shown in FIGS. 1 and 2. The energy transmitter which again is shown as an LED 15 is mounted on axis as it was in the case of FIG. 1 but is now surrounded by a casing 150 which holds it in a central position with respect to a lens 152 mounted in the end of casing 150. Energy such as modulated infrared energy is directed along paths such as shown by dash line 18 through lenses 155 and 157 arranged in similar fashion to the arrangement shown in FIG. 2. The energy is passed through an aperture 160 and is again focused on the remote surface 10 as a spot of light. The aperture 160 is shown in FIG. 3 because it has been found that the return energy is focused better utilizing an aperture. Again in FIG. 3, for simplicity, the light being reflected off of the remote position 10F and the near position 10N is not shown and only the energy reflected off the surface at position 10 will be described. This reflected light travels along paths such as solid line 170 back through the aperture 160 and lenses 157 and 155 to a reflector such as parabolic reflector 180 which directs the energy to the horizontally placed radiation detector 182 at a central position thereon. Although not shown, light which would be reflected from the surface 10 at its near position 10N would pass through aperture 160, lenses 157 and 155 and be reflected off of the parabolic reflector 180 so as to strike the sensor 182 more towards its left end and light reflected off the surface at its far position 10F would pass through aperture 160, lenses 157 and 155 and be reflected off of parabolic reflector 180 more towards the right end of sensor 182. The output of sensor 182 will be taken by leads 194 and 196 on the right end thereof and by leads 197 and 199 on the left end thereof. These outputs, as was the case in connection with FIGS. 1 and 2, will be utilized to determine the position of the spot on the detector 182 and thus the distance to the remote surface 10 as, for example, by utilizing a circuit such as shown in FIG. 4. It should be noted that the horizontally positioned sensor 110 of FIG. 2 and 182 of FIG. 3 can utilize energy being reflected from the surface from all sides which increases the output available to the detector. Likewise, off axis hot spots will again have the opposite effect on the detector 182 as was described in connection with FIG. 2. A parabolic reflector of FIG. 3 helps to provide a detector which has a spot of energy thereon in better focus for all positions of the remote surface 10 and helps to direct the energy to the detector at a larger angle, i.e., 60° to 90°, this is the case with the apparatus of FIG. 2.

Referring now to FIG. 4, one possible circuit for determining the position of the spot of light on the detector 182 of FIG. 3 (or the left end of detector 110 of FIG. 2 of the combined left ends of detectors 36, 36', 36", and the unshown detector of FIG. 1) is shown. In FIG. 4 the output from the left end of the detector 182 is shown on lines 197 and 199 being presented to an operational amplifier 200 having a feedback resistor 202. As mentioned earlier, the signal from the LED projectors may be modulated so that the output signal from the ends of the diffuse detectors are modulated current signals which vary in magnitude with the position of the spot on the tube. The purpose of amplifier 200 is to convert the modulated current signal to a modulated voltage signal. This modulated voltage signal is presented through a capacitor 210 to remove any DC background noise and thence to a sample-and-hold circuit 212 which takes the peak of the modulated voltage and produces a constant value voltage signal on its output line 215. This signal is presented to an A-to-D converter 220 which digitizes the signal and presents it to microprocessor 225.

The output signal from the right hand end of the diffuse sensor 182 of FIG. 3 (or the right hand end of detector 110 of FIG. 2 or the combined right hand ends of detectors 36, 36', 36", and the unshown detector of FIG. 1) is presented on lines 194 and 196 to a second operational amplifier 230 having a feedback resistor 232. As was the case in connection with amplifier 200 described above, amplifier 230 operates to change the modulated current signal to a modulated voltage signal and this signal is presented to capacitor 240 to remove any background noise and thence to a second sample-and-hold circuit 242. Sample-and-hold circuit 242, like sample-and-hold circuit 212 operates to take the peak of the incoming voltage and hold the value at a constant for presentation on a line 245 to a second A-to-D converter 250. A-to-D converter 250 digitizes the signal from the sample-and-hold circuit 242 and presents it to the microprocessor 225. The microprocessor 225 operates to characterize the inputs it receives in accordance with the fraction $A-B/A+B$ as mentioned above and produces an output signal on line 260 which is of magnitude representative of the position of the bands on the sensors of FIGS. 1, 2, or 3 which, as explained above, is indicative of the distance to the remote object. This signal may be used with an indicator to indicate the desired distance or in robotics to control the position of a moving arm or just to provide an alarm if the surface is not at a desired position.

It is thus seen that I have provided a novel system for determining the position of a remote surface in a simple, inexpensive, and accurate manner. Many modifications to the preferred embodiments described above will occur to those skilled in the art and I do not intend to be limited by the specific disclosures used in connection with these preferred embodiments. I intend rather only to be limited by the following claims.

I claim:

1. Apparatus for use with a remote surface comprising:
   first means for directing energy generally along an axis to the remote surface and for directing energy which is reflected from the surface back generally along the axis;
   elongated energy responsive means comprising at least one single elongated detector of the type which produces an output indicative of the position that energy impinges thereon along the length thereof, said energy responsive means mounted contiguous the axis to receive reflected energy at a first position along the length thereof when the surface is at a first distance from the apparatus, to receive reflected energy at a second position along the length thereof when the surface is a second distance from the apparatus and to receive reflected energy at positions between the first and second position when the surface is at distances between the first and second distance from the apparatus, the energy responsive means producing an output which varies with the position of the received energy as an indication of the distance between the surface and the apparatus.

2. Apparatus according to claim 1 wherein the energy responsive means is mounted around the axis so that the energy reflected from the surface is received substantially symmetrically around the energy responsive means.

3. Apparatus according to claim 2 wherein the energy responsive means includes first and second elongated detectors each with a length lying along a line which is at an acute angle with respect to the axis.

4. Apparatus according to claim 2 wherein the energy responsive means comprises first and second elongated detectors, each having first and second ends and being spaced around the axis substantially 180° apart so that both the first and second detectors receive energy reflected from the surface and so that energy reflected from a point on the surface away from the axis is received on the first detector closer to the first end thereof than energy from the point is received on the second detector.

5. Apparatus according to claim 4 further including third and fourth elongated detectors, each having first and second ends and being spaced around the axis substantially 180° apart and substantially 90° from the first and second detectors so that both the third and fourth detectors receive energy from the surface and so that energy reflected from a point on the surface away from the axis is received on the third detector closer to the first end thereof than energy from the point is received on the fourth detector.

6. Apparatus according to claim 5 wherein the first, second, third, and fourth detectors each have a length lying along a line which is at an acute angle with respect to the axis.

7. Apparatus according to claim 2 wherein said at least one single elongated detector has first and second ends and is positioned along the axis to receive energy reflected from the surface on first and opposite sides thereof so that energy which is reflected from a point on the surface away from the axis is received on one side of the detector closer to the first end thereof then energy from the point is received on the other side of the detector.

8. Apparatus according to claim 7 wherein the first means includes reflector means positioned to reflect energy from the surface onto the elongated detector.

9. Apparatus according to claim 8 wherein the reflector means is a paraboloid with an axis of revolution lying along the axis.

10. A surface position sensor comprising:
energy responsive detector means comprising at least one single elongated detector having a length and having an output indicative of the position that energy is received along its length;
first means directing energy along an axis to a remote surface and directing reflected energy back along the axis to the detector means, the detector means receiving the reflected energy along its length at a position which varies with the distance to the remote surface so that the output is indicative of the distance to the remote surface.

11. Apparatus according to claim 10 wherein the detector means includes an elongated diffuse material with energy responsive detectors at each end, each detector producing an output indicative of the amount of radiation received thereby, reflected energy received by the detector means at the position diffusing to the ends in a proportion which varies with the position along the length so that the amount of energy received by the detectors varies accordingly.

12. Apparatus according to claim 11 wherein the first means includes a concave reflector at least partly around the detector means to direct energy to the diffuse material at a relatively large angle.

13. Apparatus according to claim 10 wherein the detector means receives the reflected energy in a band around the periphery of the detector.

14. Apparatus according to claim 12 wherein the detector means receives the reflected energy in a band around the periphery of the diffuse material.

15. Apparatus according to claim 10 wherein the energy responsive detector means is mounted in a fixed position with respect to a point along the axis.

* * * * *